United States Patent Office 2,889,279
Patented June 2, 1959

2,889,279

METAL-CONTAINING ORGANIC COMPOSITIONS AND METHOD OF PREPARING SAME

Robert L. Carlyle, Lake Jackson, Tex., and Earl F. Morris, Ponca City, Okla., assignors to Continental Oil Company, Ponca City, Okla., a corporation of Delaware No Drawing. Application April 24, 1957
Serial No. 654,676

12 Claims. (Cl. 252—18)

This invention relates to stable oil dispersible basic metal-containing organic compositions and methods of preparing them. Such compositions possessing increased detergency and increased reserve basicity find a special utility as additives in lubricating oils, and likewise are useful for producing corrosion-inhibiting compositions and for similar purposes.

It is believed that in heavy-duty, detergent-type, lubricating oil compositions for use in diesel and internal combustion engines, at least two requirements must be met by such oils (in addition to lubricity, stability, and the like) if a high degree of engine cleanliness is to be maintained. First, the oil must possess the power to disperse insolubles formed by fuel combustion or oil oxidation, or both; and, second, the oil must be capable of neutralizing acidic lacquer precursors formed by either oil oxidation or interaction of the oil with sulfur acids produced from fuel combustion, or both of these conditions. The detergents generally employed in oils for engine operation with high sulfur fuel (e.g., conventional metal sulfonates) are only mildly alkaline and their basicity is rapidly depleted during engine operation.

It is accordingly a principal object of this invention to provide metal-containing stable dispersions of inorganic compounds in mineral oil and a process for the production of such dispersions. It is another object of our invention to provide highly useful mineral oil compositions utilizing such dispersions. Other objects of our invention will appear as the description proceeds.

To the accomplishment of the foregoing and related ends, this invention then comprises the features hereinafter fully described and particularly pointed out in the claims. The following description sets forth in detail certain illustrative embodiments of the invention, these being indicative, however, of but a few of the various ways in which the principle of the invention may be employed.

Broadly stated, the present invention is a process for the production of stable dispersions of basic metal-containing compounds in oleaginous compositions, which process comprises passing carbon dioxide through a mixture comprising an inorganic compound, an amino compound which may be either an alkanol amine or ethylene diamine, a hydrocarbon, and an oil soluble sulfonate. Passing carbon dioxide through such a mixture causes the formation of a complex consisting of carbon dioxide, the inorganic compound, and the alkanol amine. Water is then added to the resulting homogeneous composition. The purpose of the water is two-fold. First, it keeps the resulting composition fluid and, second, upon heating the mixture, the complex is hydrolyzed. Finally, the water and amino compound are removed by heating.

Alternately and somewhat less preferably, the mixture of the inorganic compound and the alkanol amine may be blown with carbon dioxide, after which the detergent (oil soluble sulfonate) and the hydrocarbon are added. Water is then added and the resulting mixture heated to remove the water and the alkanol amine.

While we do not wish to be bound by any particular theory as to the mechanism of this reaction, we believe that a complex is formed by the reaction between the carbon dioxide, the inorganic material, and the alkanol amine. Upon the hydrolysis of this complex, a compound having the following structure is formed:

$$x\text{-MCO}_3 \cdot y\text{-M(OH)}_2$$

wherein M is a metal and $x$ and $y$ are integers varying from 1 to 4.

Before proceeding with specific examples illustrating our invention, it may be well to indicate in general the nature of the materials required in the process.

INORGANIC COMPOUNDS

A rather limited number of oil insoluble inorganic compounds may be used in the process of this invention. Suitable inorganic compounds include calcium hydroxide, lead oxide, and barium oxide.

SULFONATES

Sulfonates which are suitable are oil-soluble and include alkyl sulfonates, alkaryl sulfonates, the so-called mahogany or petroleum soaps, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totaling only about 18 carbon atoms. To attain the requisite oil solubility, therefore, requires that the hydrocarbon portion of the sulfonate have a molecular weight between about 350 and 1,000. Preferably, this molecular weight is between 400 and 700. Particularly useful sulfonates include diwaxbenzene sulfonates, diwaxtoluene sulfonates, and polydodecylbenzene sulfonates; barium and calcium diwaxbenzene sulfonates being preferred. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24. As the melting point of the wax decreases, the carbon content of the mixture will average as low as 18 or a little lower.

Other sulfonates which may be used in the process of this invention include, for example, mono- and poly-wax substituted naphthalene sulfonates, diphenyl ether sulfonates, naphthalene disulfide sulfonates, diphenyl amine sulfonates, dicetyl thianthrene sulfonates, dilaurel beta-naphthol sulfonates, dicapryl nitronaphthalene sulfonates, unsaturated paraffin wax sulfonates, hydroxy substituted paraffin wax sulfonates, tetra-amylene sulfonates, mono- and poly-chlorosubstituted paraffin wax sulfonates, nitrosoparaffin wax sulfonates; cycloaliphatic sulfonates such as lauryl- cyclo-hexyl sulfonates, mono- and poly-wax substituted cyclo-hexyl sulfonates, and the like. The expression "petroleum sulfonate" is intended to cover all sulfonates derived from petroleum product.

HYDROCARBONS

Suitable hydrocarbons include the hydrocarbons having a boiling point falling within the range of 115 to 400 degrees centigrade and also include mineral lubricating oil obtained by any of the conventional refining procedures.

ALKANOL AMINES AND DIAMINES

Suitable alkanol amines include mono-ethanol amine, diethanol amine, tri-ethanol amine, butyl di-ethanol amine, di-(2-ethyl hexyl) ethanol amine, and amino-ethyl ethanol amine. A suitable diamine is ethylene diamine. The amount of alkanol amine or diamine used is not critical but may vary from 1 part or more per part of the sulfonate used.

As to the amount of the inorganic compound incorporated in the mixture, that may range up to 5 percent, based on the total weight of the alkanol-amine used.

With reference to the water, the amount used should be sufficient to hydrolize the amine oxide-carbon dioxide complex and sufficient to prevent jelling during the process. The generally amounts to about 20 percent, based on the total amount of sulfonate used.

All of the base numbers of the products of this invention were determined by the acetic acid titration method which utilizes glacial acetic acid as the solvent and a solution of perchloric acid in glacial acetic acid as the titrant. The method is especially adapted for determinations of this type since equilibria are obtained rapidly. The procedures for carrying out acetic acid titrations are generally outlined in Analytical Chemistry, vol. 23, No. 2, February 1951, page 337, and vol. 24, No. 3, March 1952, page 519.

By the term homogeneous mass, as used in this description, is meant either a single phase which contains both the oil insoluble inhibitor and the oil soluble detergent in a state of uniform finely divided dispersion with or without the existence of a part of such compounds in a single phase.

In order to disclose the nature of the present invention still more clearly, the following illustrative examples will be given. It is to be understood that the invention is not to be limited to the specific conditions or details set forth in these examples except in so far as such limitations are specified in the appended claims. Parts given are parts by weight.

Example 1

Five parts of calcium hydroxide was added to 100 parts of mono-ethanolamine and the resulting mixture was added to a reaction vessel equipped with an agitator, a condenser for reflux purposes, and a thermometer. One hundred parts of neutral barium polydodecylbenzene sulfonate solution (50 parts active sulfonate, 50 parts 170 S.S.U. pale oil at 100° F.) was added, with agitation, to the foregoing mixture and the contents were heated to 150° C. Carbon dioxide was then passed through the mixture until all the calcium hydroxide was dissolved in the alkanolamine. At the end of the carbon dioxide treatment 10 parts of water was added, after which the mixture was heated to 170° C., which was sufficient to distill off the ethanolamine and water. The final product was bright and oil-soluble and had a base number of 89.

Example 2

The procedure of Example 1 was repeated with the exception that 100 parts of ethylene diamine was substituted for mono-ethanolamine. As in Example 1, the product obtained was bright and oil-soluble and it had a base number of 90.

Example 3

The procedure of Example 1 was again repeated with the exception that 5 parts of barium oxide was substituted for the calcium hydroxide. As in Example 1, the final product obtained was bright and oil-soluble. It had a base number of 45.

Example 4

In this example, a series of experiments were run following the procedure of Example 1 with the exception that the oxides of copper, zinc, and cadmium were each substituted for the calcium hydroxide used in that example. The products so obtained were unsatisfactory for the purposes of our invention.

The neutral barium postdodecylbenzene sulfonate used in the foregoing examples was prepared by neutralizing postdodecylbenzene sulfonic acid with barium hydroxide. Postdodecylbenzene sulfonic acid was prepared by sulfonating postdodecylbenzene. Postdodecylbenzene comprises monoalkylbenzenes and dialkylbenzenes in the approximate ratio of 2:3. Its typical physical properties are as follows:

| | |
|---|---|
| Specific gravity at 38° C | 0.8649 |
| Average molecular weight | 385 |
| Percent sulfonatable | 88 |

A.S.T.M., D-158 Engler:

| | | |
|---|---|---|
| I.B.P. | ° F | 647 |
| 5 | ° F | 682 |
| 50 | ° F | 715 |
| 90 | ° F | 760 |
| 95 | ° F | 775 |
| F.B.P. | ° F | 779 |
| Refractive index at 23° C | | 1.4900 |

Viscosity at:

| | | |
|---|---|---|
| —10° C | centipoises | 2800 |
| 20 | do | 280 |
| 40 | do | 78 |
| 80 | do | 18 |
| Aniline point | ° C | 69 |
| Pour point | ° F | —25 |

In another series of examples, calcium diwaxbenzene sulfonate, calcium diwaxtoluene sulfonate, and calcium lauryl sulfonate were substituted for the barium polydodecylbenzene sulfonate used in Examples 1 to 6 inclusive. The products obtained in each case were similar to the products obtained in the foregoing examples.

In the foregoing detailed description, it will be apparent that many variations may be made without departing from the spirit and scope of the invention. Thus, for example, calcium oxide may be substituted for calcium hydroxide, and barium hydroxide may be substituted for barium oxide without changing the final product. Many other variations will be apparent to those skilled in the art. We therefore intend to be limited only in accordance with the following patent claims.

We claim:

1. A process of dispersing an inorganic compound selected from the group consisting of calcium hydroxide, barium oxide, and lead oxide in a non-volatile hydrocarbon solution containing an oil soluble alkaryl sulfonate, selected from the group consisting of barium alkaryl sulfonate and calcium alkaryl sulfonate, which comprises: preparing a mixture comprised of at least about 100 parts of an amino organic compound selected from the group consisting of alkanol amines and ethylene diamine and an amount of said inorganic compound up to about 5 percent of said amino compound; agitating said mixture and adding thereto about 50 parts of alkaryl sulfonate and a hydrocarbon selected from the group consisting of hydrocarbons with a boiling point falling within the range of 115 to 400° C. and a lubricating oil, as diluent for said sulfonate; heating and agitating said mixture; passing through said mixture sufficient carbon dioxide to dissolve the inorganic compound in the amino compound; adding water to the resulting mixture in an amount equal to about 20 percent of the amount of alkaryl sulfonate, whereby said mixture is maintained in a fluid state and the reaction product is hydrolyzed; and heating said mixture to remove the amino compound and water.

2. The process of claim 1 wherein the amino organic compound is mono-ethanol amine.

3. The process of claim 1 wherein the amino organic compound is ethylene diamine.

4. The process of claim 1 wherein the amino organic compound is butyl di-ethanol amine.

5. The process of claim 1 wherein the amino organic compound is di(2-ethyl hexyl)ethanol amine.

6. The process of claim 1 wherein the inorganic compound is calcium hydroxide.

7. The process of claim 1 wherein the inorganic compound is lead oxide.

8. The process of claim 1 wherein the inorganic compound is barium oxide.

9. The process of claim 1 wherein the oil soluble alkaryl sulfonate is barium postdodecylbenzene sulfonate.

10. The process of claim 1 wherein the oil soluble alkaryl sulfonate is calcium diwaxbenzene sulfonate.

11. The process of claim 1 wherein the oil soluble alkaryl sulfonate is calcium diwaxtoluene sulfonate.

12. The process of claim 1 wherein the oil soluble alkaryl sulfonate is calcium lauryl sulfonate.

References Cited in the file of this patent

UNITED STATES PATENTS 2,695,910   Asseff et al. _____ Nov. 30, 1954

OTHER REFERENCES

Concise Chemical and Technical Dictionary, Chem. Pub. Co., N.Y. (1947), page 27.